United States Patent
Chen et al.

(10) Patent No.: US 11,368,984 B2
(45) Date of Patent: Jun. 21, 2022

(54) RANDOM ACCESS METHOD AND USER EQUIPMENT

(71) Applicant: VIVO MOBILE COMMUNICATION CO., LTD., Guangdong (CN)

(72) Inventors: Li Chen, Guangdong (CN); Yumin Wu, Guangdong (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 137 days.

(21) Appl. No.: 16/765,078

(22) PCT Filed: Oct. 31, 2018

(86) PCT No.: PCT/CN2018/112938
§ 371 (c)(1),
(2) Date: May 18, 2020

(87) PCT Pub. No.: WO2019/096003
PCT Pub. Date: May 23, 2019

(65) Prior Publication Data
US 2020/0359420 A1    Nov. 12, 2020

(30) Foreign Application Priority Data
Nov. 16, 2017    (CN) .......................... 201711140198.3

(51) Int. Cl.
*H04W 24/10*    (2009.01)
*H04W 74/08*    (2009.01)
*H04L 5/00*    (2006.01)

(52) U.S. Cl.
CPC ....... *H04W 74/0833* (2013.01); *H04L 5/0092* (2013.01); *H04W 24/10* (2013.01)

(58) Field of Classification Search
CPC ........................................................ H04L 12/28
USPC .......................................................... 370/329
See application file for complete search history.

(56) References Cited

U.S. PATENT DOCUMENTS

| | | | |
|---|---|---|---|
| 10,785,739 B2 * | 9/2020 | Jeon | ..................... H04B 7/0695 |
| 2012/0063302 A1 | 3/2012 | Damnjanovic et al. | |
| 2013/0083695 A1 | 4/2013 | Narasimha et al. | |

FOREIGN PATENT DOCUMENTS

| CN | 102804901 A | 11/2012 |
|---|---|---|
| CN | 103931263 A | 7/2014 |
| WO | 2017161314 A1 | 9/2017 |

OTHER PUBLICATIONS

Extended European Search Report dated Nov. 13, 2020 issued in PCT/CN2018/112938.
3GPP TSG RAN WG1 Meeting #90bis, R1-1717036, Prague, Czech, Republic, Oct. 9-13, 2017, "Remaining details of RACH procedure", 25 pages.
3GPP TSG RAN WG1 Meeting #90bis, R1-1717582, Prague, Czech, Oct. 9-13, 2017, "Remaining details an PRACH procedure", 15 pages.
3GPP TSG-RAN WG2 Meeting #99bis, R2-1710217, Prague, Czech, Oct. 9-13, 2017, "User plane impacts tor Bandwidth Parts", 6 pages.

(Continued)

*Primary Examiner* — Dang T Ton
(74) *Attorney, Agent, or Firm* — Brooks Kushman P.C.

(57) ABSTRACT

A random access method and device are provided. The method includes: determining a target Random Access Channel (RACH) resource from an RACH resources of two or more Uplinks (ULs); and performing random access according to the target RACH resource.

15 Claims, 4 Drawing Sheets

(56) References Cited

OTHER PUBLICATIONS

3GPP TSG-RAN WG4 Meeting #84bis, R4-1711227, Dubrovnik, Croatia, Oct. 9-13, 2017, "Discussion on RRM mpact on uplink sharing", 6 pages.
Office Action dated Apr. 23, 2020 issued in Chinese Application No. 201711140198.3.
Office Action dated Oct. 19, 2020 issued in Chinese Application No. 201711140198.3.
3GPP TSG RAN WG1 NR Ad-Hoc#2, R1-1710385 "Issues on UL Transmission for LTE-NR Co-Existence" Qingdao, P.R., China Jun. 27-30, 2017, 5 pages.
3GPP TSG RAN WG1, Meeting 90bis, R1-1719033, "Offline Summary for AI 7.1.2.2 Remaining Details on Remaining Minimum System Information", Prague, CZ, Oct. 9-13, 2017, 14 pages.
3GPP TSG RAN WG2, Meeting #99bis, R2-1710589, "Remaining Issue in RACH Procedure During Handover", Prague, Czech Republic, Oct. 9-13, 2017, 5 pages.
3GPP TSG-RAN WG2, Meeting #99bis, R2-1711824, "Considerations on Support of Supplementary Uplink Frequency", Prague, Czech, Oct. 9-13, 2017, 6 pages.

\* cited by examiner

RANDOM ACCESS METHOD AND USER EQUIPMENT

CROSS-REFERENCE TO RELATED APPLICATIONS

The present application is the U.S. national phase of PCT Application No. PCT/CN2018/112938 files on Oct. 31, 2018, which claims a priority to Chinese Patent Application No. 201711140198.3 filed in China on Nov. 16, 2017, the disclosure of which is incorporated herein by reference in its entirety.

TECHNICAL FIELD

The present disclosure relates to the field of communication technologies, and in particular, to a random access method and a User Equipment (UE).

BACKGROUND

In a Long Term Evolution (LTE) system, when a base station is configured with both a common Random Access Channel (RACH) resource for a contention-based RACH and a dedicated RACH resource for a contention-free RACH, a UE preferentially selects the dedicated RACH resource to perform random access. When no dedicated RACH resource is configured, the UE will select the common RACH resource to perform contention-based random access.

However, when two frequencies (corresponding to two Uplinks (ULs)) or more frequencies are configured with the common RACH resource or the dedicated RACH resource, how to select a random access resource is an urgent problem to be solved.

SUMMARY

In a first aspect, the present disclosure provides a random access method, including: determining a target RACH resource from RACH resources of two or more ULs; and performing random access according to the target RACH resource.

In a second aspect, the present disclosure further provides a random access method, including: determining a target UL and/or a target BWP for random access; and switching a UL and/or switching a BWP during an RACH process according to the target UL and/or the target BWP.

In a third aspect, the present disclosure further provides a UE, including: a first determining module, used to determine a target RACH resource from RACH resources of two or more ULs; and a first processing module, used to perform random access according to the target RACH resource.

In a fourth aspect, the present disclosure further provides a UE, including: a second determining module, used to determine a target UL and/or a target BWP for random access; and a second processing module, used to switch a UL and/or switch a BWP during an RACH process according to the target UL and/or the target BWP.

In a fifth aspect, the present disclosure further provides a UE, including: a processor, a memory, and a program stored on the memory and executable on the processor, wherein the program is used to be executed by the processor to implement steps of the random access method according to the first aspect; or steps of the random access method according to the second aspect.

In a sixth aspect, the present disclosure further provides a computer-readable storage medium, wherein a program is stored on the computer-readable storage medium, and the program is used to be executed by a processor to implement steps of the random access method according to the first aspect or the second aspect.

BRIEF DESCRIPTION OF THE DRAWINGS

Various other advantages and benefits will become apparent to a person skilled in the art upon reading the detailed description of the optional embodiments below. The accompanying drawings are only for the purpose of illustrating the optional embodiments and are not considered to be a restriction on the present disclosure. Moreover, same reference numerals are used to represent same parts throughout the accompanying drawings.

DETAILED DESCRIPTION

Figure 1:
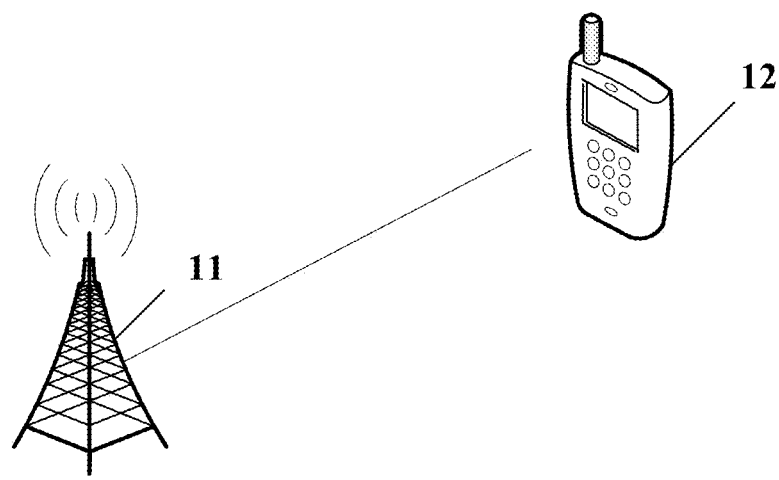
FIG. 1 is a schematic structural diagram of a wireless communication system according to an embodiment of the present disclosure.

Technical solutions in the embodiments of the present disclosure will be described clearly and completely below in combination with the accompanying drawings in the embodiments of the present disclosure. Obviously, the described embodiments merely relate to a part of, rather than all of, the embodiments of the present disclosure. Based on the embodiments in the present disclosure, all other embodiments obtained by a person skilled in the art without creative efforts also fall within the protection scope of the present disclosure.

The term "include" and any variants thereof in the specification and the claims of this application are intended to cover non-exclusive inclusions, for example, processes, methods, systems, products, or devices that include a series of steps or units need not be limited to those steps or units that are explicitly listed, but may include other steps or units that are not explicitly listed or that are inherent to these processes, methods, products, or devices. In addition, the term "and/or" that used in the specification and the claims indicates at least one of associated objects; for example, A and/or B indicates individual A, individual B, or A and B. The term "one or a combination of multiple objects" that used in the specification and the claims indicates at least one of them, for example, a one or a combination of at least two of A, B, and C indicates: individual A, individual B, individual C, A and B, A and C, B and C, or A, B and C.

In the embodiments of the present disclosure, such word as "exemplary" or "for example" is used as an example, illustration, or description. Any embodiment or design described as "exemplary" or "for example" in the embodiments of the present disclosure should not be construed as more preferred or advantageous over other embodiments or designs. Specifically, use of words such as "exemplary" or "for example" is intended to present related concepts in a concrete manner.

Several technical terms are introduced below.

(1) About Supplementary Uplink carrier (SUL carrier): in a fifth-generation (5G) system, two uplink carriers may be configured for one downlink carrier, one of which is an SUL carrier, and the SUL carrier may be configured for a Primary Cell (PCell) or Secondary Cell (SCell).

(2) About Bandwidth Part (BWP): a 5G New Radio (NR) system supports a maximum system bandwidth of 400 MHz, which is much larger than a maximum system bandwidth of 20 MHz in a Long Term Evolution (LTE) system, so as to support a larger system and user throughput. However, supporting such a large system bandwidth will be a huge challenge for implementing the UE with low cost. Therefore, the 5G NR system also supports dynamic and flexible bandwidth allocation, and divides a system bandwidth into multiple BWPs to support a narrowband UE or a UE in an energy-saving mode to access the system.

The 5G NR system supports an operating frequency band above 6 GHz, which can provide greater throughput for data transmission. Wavelength of a high-frequency signal is short. Compared with low-frequency band, more antenna elements may be arranged on a panel of a same size, and multiple beams with stronger directivity and narrower lobes may be formed by using a beamforming technology. The 5G NR system transmits a broadcast signal or system information to a UE in a cell through a beam scanning technology.

The embodiments of the present disclosure will be described below in combination with the accompanying drawings. Carrier state control methods and devices provided by the embodiments of the present disclosure can be applied to a wireless communication system. The wireless communication system may be a 5G mobile communication system (referred to as a 5G system for short hereinafter). Referring to FIG. 1, a schematic structural diagram of a wireless communication system according to an embodiment of the present disclosure is provided. As shown in FIG. 1, the wireless communication system may include a network-side device 10 and a UE. For example, the UE may be referred to as a UE 11, and the UE 11 may communicate with the network-side device 10. In a practical application, a connection between the above devices may be a wireless connection. In order to conveniently and intuitively represent a connection relationship between various devices, a solid line is used in FIG. 1 for illustration.

It should be noted that the above wireless communication system may include a plurality of UEs, and a network-side device may communicate with the plurality of UEs by transmitting signaling or transmitting data.

The network-side device provided by the embodiments of the present disclosure may be a base station, and the network-side device may be, e.g., a commonly used base station, or an evolved Node Base station (eNB), or a network-side device in the 5G system (such as a next generation Node Base station (gNB) or a Transmission and Reception Point (TRP)).

The UE provided in the embodiments of the present disclosure may be a mobile phone, a tablet computer, a notebook, an Ultra-Mobile Personal Computer (UMPC), a netbook, or a Personal Digital Assistant (PDA), etc.

In order to make objectives, technical solutions, and advantages of the present disclosure more clear, the technical solutions in the embodiments of the present disclosure will be described clearly and completely below in combination with the accompanying drawings in the embodiments of the present disclosure. Obviously, the described embodiments merely relate to a part of, rather than all of, the embodiments of the present disclosure. Based on the embodiments in the present disclosure, all other embodiments obtained by a person skilled in the art without creative efforts also fall within the protection scope of the present disclosure.

Figure 2:
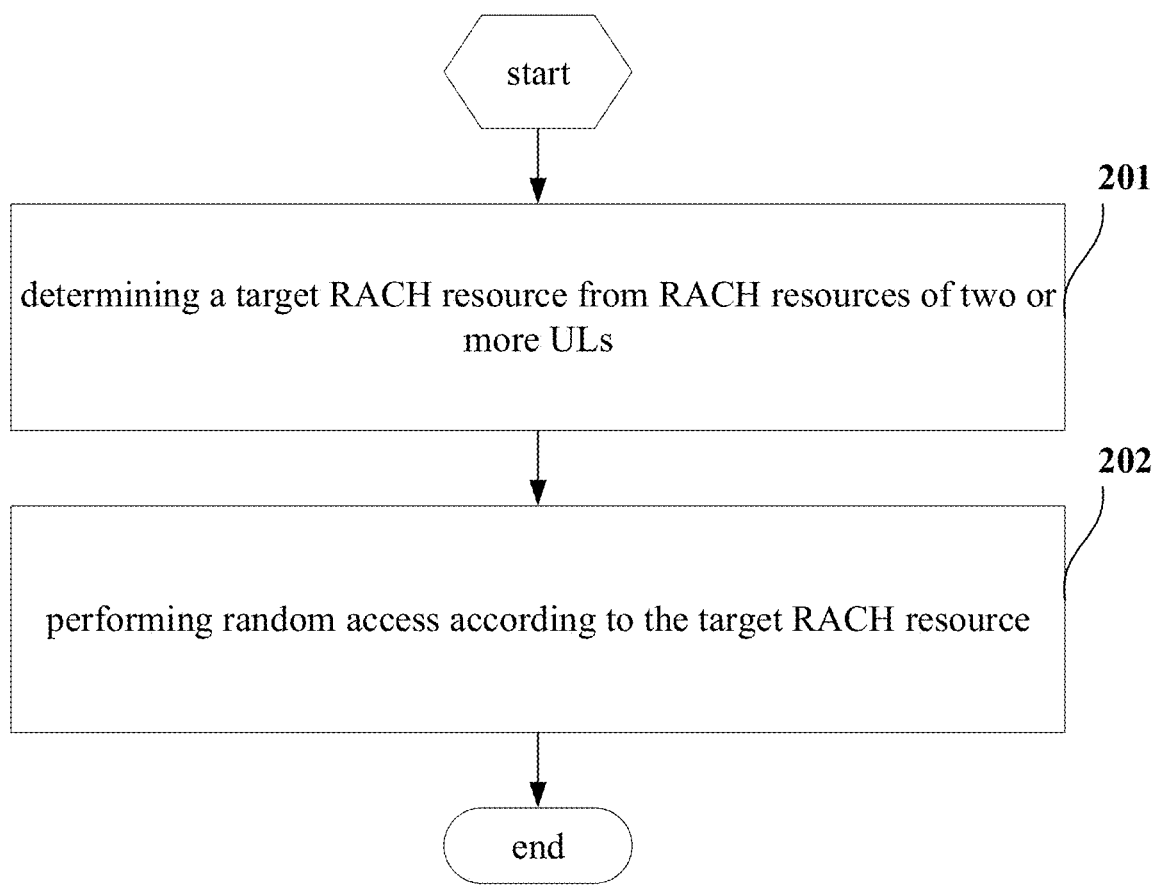
FIG. 2 is a first flowchart of a random access method according to an embodiment of the present disclosure.

Referring to FIG. 2, a flowchart of a random access method is shown. The method is executed by the UE, and include the following steps: a step 201 of determining a target RACH resource from RACH resources of two or more ULs; and a step 202 of performing random access according to the target RACH resource.

Method 1: determining the target RACH resource from the RACH resources of the two or more ULs according to one or a combination of at least two of a UL type, a UL frequency, an RACH resource type, and a measurement performance, wherein the UL type includes: an SUL and a normal UL, and the measurement performance is a measurement performance of the UL or a BWP, or a measurement performance of a downlink carrier corresponding to the normal UL.

In the embodiments of the present disclosure, the measurement performance includes at least one of: Reference Signal Received Power (RSRP), Reference Signal Received Quality (RSRQ), Signal to Interference plus Noise Ratio (SINR), and Channel Quality Indicator (CQI). Naturally, the present disclosure is not limited thereto.

In the embodiments of the present disclosure, the coverage may be enhanced by selecting a low frequency, or Radio Frequency (RF) tuning/retuning for the UE may be avoided by selecting a same frequency as a current operating frequency.

Method 2: determining the target RACH resource from the RACH resources of the two or more ULs according to an RACH purpose or an RACH reason.

For example: determining an RACH resource of a normal UL or an SUL among the RACH resources of the two or more ULs as the target RACH resource according to the RACH purpose or the RACH reason; or determining a dedicated RACH resource among the RACH resources of the two or more ULs as the target RACH resource according to the RACH purpose or the RACH reason.

The above RACH purpose or the RACH reason includes, but is not limited to: enabling an initial idle UE to be connected to a network; Radio Resource Control (RRC) reestablishment; switching; downlink data arrival but uplink being out of sync; uplink data arrival but uplink being out of sync; the UE changing from an non-activated state to an active state; and supporting uplink synchronization acquisition of a Secondary cell (Scell).

In this way, the UE may determine the target RACH resource from the RACH resources of the two or more ULs; and then perform random access according to the target RACH resource to improve flexibility of random access.

Figure 3:
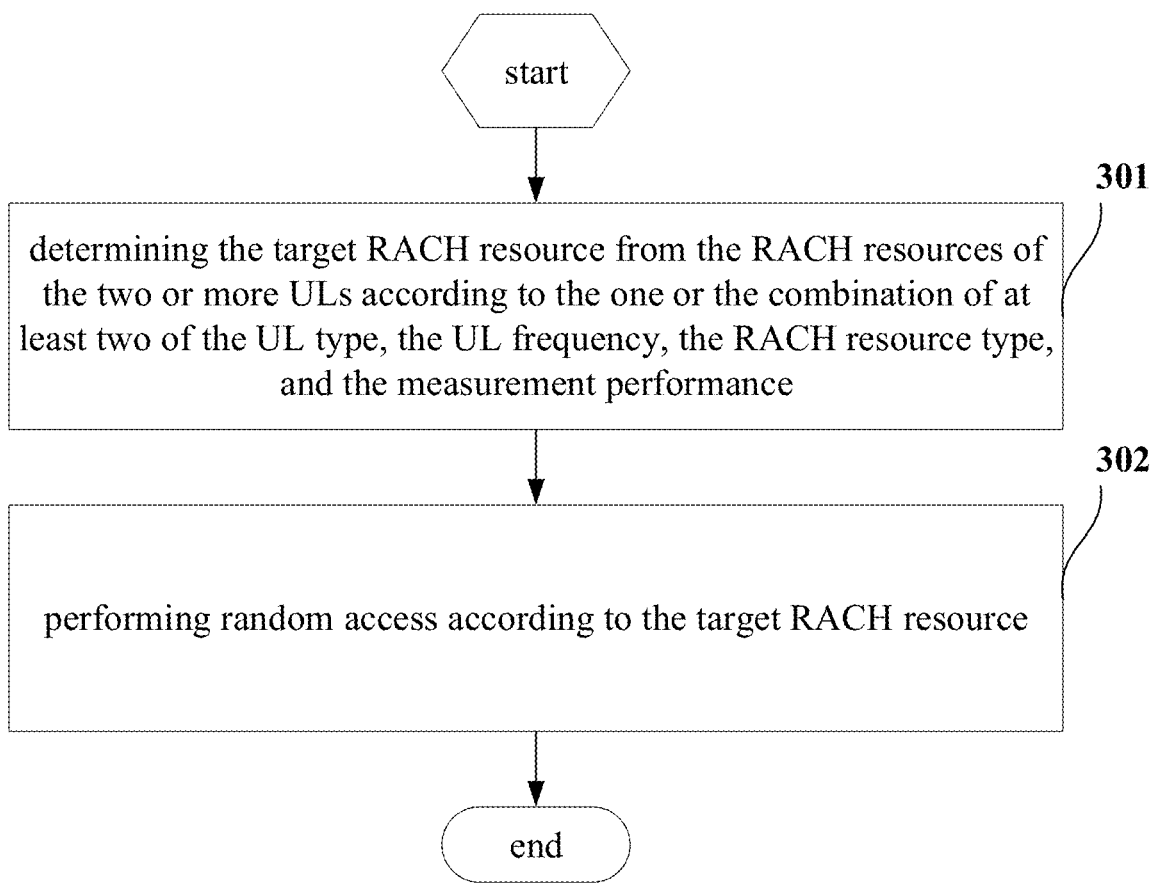
FIG. 3 is a second flowchart of the random access method according to an embodiment of the present disclosure.

Referring to FIG. 3, a flowchart of a random access method is shown. The method is executed by the UE and includes steps 301 and 302.

Step 301: determining the target RACH resource from the RACH resources of the two or more ULs according to the one or the combination of at least two of the UL type, the UL frequency, the RACH resource type, and the measurement performance. In the embodiments of the present disclosure, the UL type includes: the SUL and the normal UL.

In the embodiments of the present disclosure, the measurement performance is the measurement performance of the UL or the BWP or the measurement performance of the downlink carrier corresponding to the normal UL, and the measurement performance includes at least one of: the RSRP, the RSRQ, the SINR, and the CQI. Naturally, the present disclosure is not limited thereto.

Step 302: performing random access according to the target RACH resource.

In the embodiments of the present disclosure, when an activated BWP is configured with the RACH resource, the target RACH resource may be determined from the RACH resources of the two or more ULs according to one of the following principles.

Principle 1: the UL type is the normal UL or the Secondary Uplink (SUL), that is, the normal UL or the SUL is preferential.

Taking the normal UL being preferential as an example: as long as a BWP activated by the normal UL is configured with the RACH resource, an RACH resource on the BWP activated by the normal UL is preferentially selected.

Specifically, the BWP activated by the normal UL is configured with a dedicated RACH or a common RACH, and the SUL is configured with the dedicated RACH resource or the common RACH resource (no matter whether the SUL is configured with the BWP and a certain BWP is configured with the dedicated RACH resource or the common RACH resource, or the SUL is not configured with the BWP and the RACH resource is directly configured on the SUL), and the RACH resource configured on the BWP activated by the normal UL is preferentially selected. When the target RACH resource is determined from the RACH resources of the two or more ULs according to a principle that the normal UL is preferential, it can prevent the UE from frequent RF retuning, and reduce power consumption and time delay.

Taking the SUL being preferential as an example: when the target RACH resource is determined from the RACH resources of the two or more ULs according to a principle that the SUL is preferential, the RACH resource on the normal UL can be offloaded, the resource of the normal UL can be saved, and a probability of collision of the RACH resources of the normal UL can be reduced.

Principle 2: the dedicated RACH is preferential.

When a certain UL or a certain BWP of a certain UL is configured with a dedicated resource, the dedicated RACH resource is preferentially selected.

Principle 3: the measurement performance is preferential.

In an embodiment of the present disclosure, methods of determining the target RACH resource from the RACH resources of the two or more ULs according to the principle 3 are as follows.

Method 1: when a measurement of a first UL is higher than a measurement of a second UL or a measurement of a downlink carrier corresponding to the first UL is higher than a measurement of a downlink carrier corresponding to the second UL, determining an RACH resource of the first UL as the target RACH resource, wherein the measurement of the first UL is a measurement performance of the first UL or a measurement performance of a first BWP of the first UL, the measurement of the second UL is a measurement performance of the second UL or a measurement performance of a second BWP of the second UL, the RACH resource of the first UL corresponds to an RACH resource on the first UL or an RACH resource on the first BWP of the first UL. The measurement of the first UL may be notified to the UE by the network side, and a notification method is not specifically limited in the embodiments of the present disclosure.

Method 2: when the measurement of the first UL or the measurement of the downlink carrier corresponding to the first UL is lower than a first preset threshold, determining an RACH resource of another UL in two or more ULs as the target RACH resource, wherein the measurement of the first UL is the measurement performance of the first UL or the measurement performance of the first BWP of the first UL, and the measurement of the downlink carrier corresponding to the first UL is the measurement performance of the downlink carrier corresponding to the first UL or the measurement performance of the first BWP of the downlink carrier corresponding to the first UL; and the RACH resource of the other UL corresponds to the RACH resource on the other UL or an RACH resource on a second BWP of the other UL.

Method 3: when the measurement of the first UL or the measurement of the downlink carrier corresponding to the first UL is higher than a second preset threshold, determining the RACH resource of the first UL as the target RACH resource, wherein the measurement of the first UL is the measurement performance of the first UL or the measurement performance of the first BWP of the first UL, and the measurement of the downlink carrier corresponding to the first UL is the measurement performance of the downlink carrier corresponding to the first UL or the measurement performance of the first BWP of the downlink carrier corresponding to the first UL; and the RACH resource of the first UL corresponds to the RACH resource on the first UL or the RACH resource on the first BWP of the first UL;

Method 4: when the measurement of the first UL or the measurement of the downlink carrier corresponding to the first UL is lower than a third preset threshold, and the measurement of the second UL or the measurement of the downlink carrier corresponding to the second UL is higher than the third preset threshold, determining the RACH resource of the second UL as the target RACH resource, wherein the measurement of the first UL is the measurement performance of the first UL or the measurement performance of the first BWP of the first UL, and the measurement of the downlink carrier corresponding to the first UL is the measurement performance of the downlink carrier corresponding to the first UL or the measurement performance of the first BWP of the downlink carrier corresponding to the first UL, the measurement of the second UL is the measurement performance of the second UL or the measurement performance of the second BWP of the second UL, the measurement of the downlink carrier corresponding to the second UL is the measurement performance of the downlink carrier corresponding to the second UL or the measurement performance of the second BWP of the downlink carrier corresponding to the second UL, and the RACH resource of the second UL corresponds to an RACH resource on the second UL or an RACH resource on the second BWP of the second UL;

Method 5: when the measurement of the first UL is higher than the measurement of the second UL or the measurement of the downlink carrier corresponding to the first UL is higher than the measurement of the downlink carrier corresponding to the second UL, and the measurement of the first UL or the measurement of the downlink carrier corresponding to the first UL is higher than a fourth preset threshold, determining the RACH resource of the first UL as the target RACH resource, wherein the measurement of the first UL is the measurement performance of the first UL or the measurement performance of the first BWP of the first UL, the measurement of the downlink carrier corresponding to the first UL is the measurement performance of the downlink carrier corresponding to the first UL or the measurement performance of the first BWP of the downlink carrier corresponding to the first UL, the measurement of the second UL is the measurement performance of the second UL or the measurement performance of the second BWP of the second UL, the measurement of the downlink carrier corresponding to the second UL is the measurement performance of the downlink carrier corresponding to the second UL or the measurement performance of the second BWP of the downlink carrier corresponding to the second UL, and the RACH resource of the first UL corresponds to the RACH resource on the first UL or the RACH resource on the first BWP of the first UL.

It should be noted that, in the embodiments of the present disclosure, the first preset threshold, the second preset threshold, the third preset threshold, and the third preset threshold are not specifically limited.

In the embodiments of the present disclosure, the UE may determine the target RACH resource from the RACH resources of the two or more ULs according to a combination of two or more principles introduced above.

Method 1: selecting the UL according to the above principle 1, principle 2, or principle 3, and then selecting an RACH resource on a BWP of the UL according to the above principle 2 or principle 3.

Specifically, a UL is selected from the two or more ULs according to the one or the combination of at least two of the UL type, the UL frequency, the RACH resource type, and the measurement performance; and then the target RACH resource is determined from the selected UL according to the RACH resource type and/or the measurement performance.

Example 1: selecting the normal UL from the two or more ULs according to the principle that the normal UL is preferential, and determining a dedicated RACH resource on a first BWP of the normal UL as the target RACH resource according to the principle that the dedicated RACH resource is preferential.

Example 2: selecting the normal UL from the two or more ULs according to the principle that the normal UL is preferential; and then according to the principle that the measurement performance is preferential, when a measurement of the first BWP of the normal UL or a measurement of the downlink carrier corresponding to the normal UL or a measurement of a first BWP of the downlink carrier corresponding to the normal UL is higher than a fifth preset threshold, determining an RACH resource on the first BWP of the normal UL as the target RACH resource, wherein the measurement of the normal UL is a measurement performance of the normal UL or a measurement performance of the first BWP of the normal UL, and the measurement of the downlink carrier corresponding to the normal UL is the measurement performance of the downlink carrier corresponding to the normal UL or a measurement performance of the first BWP of the downlink carrier corresponding to the normal UL. It should be noted that a specific value of the fifth preset threshold is not limited in the embodiments of the present disclosure.

Method 1. selecting the UL according to the above principle 1 and principle 2, or principle 1 and principle 3, or principle 2 and principle 3, or principle 1, principle 2, and principle 3, and then selecting the RACH resource on the BWP according to the above principle 2 and/or principle 3.

Specifically, selecting an RACH resource on a UL from the two or more ULs as the target RACH resource according to a combination of at least two of the UL type, the UL frequency, the RACH resource type, and the measurement performance; or selecting a UL from the two or more ULs and selecting an RACH resource of the UL as the target RACH resource according to a combination of at least two of the UL type, the UL frequency, the RACH resource type, and the measurement performance.

Example 1: the measurement performance is preferential and the normal UL is preferential. In this regard, when the measurement of the normal UL or a measurement of the downlink carrier corresponding to the normal UL is higher than a sixth preset threshold, and/or a measurement of the SUL or a measurement of a downlink carrier corresponding to the SUL is low than the sixth preset threshold, determining the RACH resource of the normal UL as the target RACH resource, wherein the measurement of the normal UL is the measurement performance of the normal UL or a measurement performance of a first BWP of the normal UL, and the measurement of the downlink carrier corresponding to the normal UL is the measurement performance of the downlink carrier corresponding to the normal UL or the measurement performance of the first BWP of the downlink carrier corresponding to the normal UL; the measurement of the SUL is a measurement performance of the SUL or a measurement performance of a second BWP of the SUL, and the measurement of the downlink carrier corresponding to the SUL is a measurement performance of the downlink carrier corresponding to the SUL or a measurement performance of a second BWP of the downlink carrier corresponding to the SUL; and the RACH resource of the normal UL corresponds to the RACH resource on the normal UL or the RACH resource on the first BWP of the normal UL.

Example 2: the dedicated RACH resource is preferential and the normal UL is preferential. In this regard, when the normal UL is configured with a dedicated RACH resource, determining the dedicated RACH resource of the normal UL as the target RACH resource.

Example 3: the measurement performance is preferential and the dedicated RACH resource is preferential. In this regard, when the measurement of the first UL or the measurement of the downlink carrier corresponding to the first UL is higher than a seventh preset threshold, and the first UL is configured with the dedicated RACH resource, determining the dedicated RACH resource of the first UL as the target RACH resource, wherein the measurement of the first UL is the measurement performance of the first UL or the measurement performance of the first BWP of the first UL.

Example 4: the measurement performance is preferential, the dedicated RACH resource is preferential, and the normal UL is preferential. In this regard, when the measurement of the normal UL or the measurement of the downlink carrier corresponding to the normal UL is higher than an eighth preset threshold, and the normal UL is configured with the dedicated RACH resource, determining the dedicated RACH resource of the normal UL as the target RACH resource, wherein the measurement of the normal UL is the measurement performance of the normal UL or a measurement performance of the first BWP of the normal UL, and the measurement of the downlink carrier corresponding to the normal UL is the measurement performance of the downlink carrier corresponding to the normal UL or the measurement performance of the first BWP of the downlink carrier corresponding to the normal UL.

It should be noted that specific values of the sixth preset threshold, the seventh preset threshold, and the eighth preset threshold are not limited in the embodiments of the present disclosure.

In the embodiments of the present disclosure, when there is no RACH resource on an activated BWP of the UL, but there is an RACH on another BWP of the current UL, the target RACH resource may be determined from the RACH resources of the two or more ULs according to the following methods.

Method 1: determining an RACH resource of a currently non-activated BWP of the current UL as the target RACH resource from the RACH resources of the two or more ULs according to the principle 2 and/or the principle 3.

Specifically, determining the RACH resource of the currently non-activated BWP of the current UL as the target RACH resource according to the RACH resource type and/or the measurement performance.

Method 2: determining an RACH resource of an non-activated BWP of the current UL as the target RACH resource from the RACH resources of the two or more ULs according to one or a combination of at least two of the principle 1, the principle 2 and the principle 3:

Example 1: the SUL is preferential and the dedicated RACH resource is preferential. For example: selecting an SUL from the two or more ULs; and determining a dedicated RACH resource of a BWP of the SUL as the target RACH resource.

Example 2: the SUL is preferential and the measurement performance is preferential. For example: selecting an SUL from the two or more ULs; and when the measurement of the SUL or the measurement of the downlink carrier corresponding to the SUL is higher than a ninth preset threshold, determining the RACH resource of the SUL as the target RACH resource.

Example 3: the measurement performance is preferential and the SUL is preferential. For example: when the measurement of the SUL or the measurement of the downlink carrier corresponding to the SUL is higher than a tenth preset threshold, and/or the measurement of the normal UL or the measurement of the downlink carrier corresponding to the normal UL is lower than the tenth preset threshold, determining an RACH resource on the SUL as the target RACH resource.

Example 4: the dedicated RACH resource is preferential and the SUL is preferential. For example, when the SUL is configured with the dedicated RACH resource, determining the dedicated RACH resource of the SUL as the target RACH resource.

Example 5: the measurement performance is preferential and the dedicated RACH is preferential. For example: when the measurement of the UL is higher than an eleventh preset threshold and the UL is configured with the dedicated RACH resource, determining a dedicated RACH resource of the UL as the target RACH resource, wherein the measurement of the UL may be the measurement performance of the UL or a measurement performance of a first BWP of the UL.

Example 6: the measurement performance is preferential, the dedicated RACH is preferential and the SUL is preferential. For example: when the measurement of the SUL or the measurement of the downlink carrier corresponding to the SUL is higher than the eleventh preset threshold, and the SUL is configured with the dedicated RACH resource, determining the dedicated RACH resource of the SUL as the target RACH resource.

The measurement of the SUL is the measurement performance of the SUL or a measurement performance of the first BWP of the SUL, and the measurement of the downlink carrier corresponding to the SUL is the measurement performance of the downlink carrier corresponding to the SUL or a measurement performance of a first BWP of the downlink carrier corresponding to the SUL; and the measurement of the normal UL is the measurement performance of the normal UL or the measurement performance of the first BWP of the normal UL, and the measurement of the downlink carrier corresponding to the normal UL is the measurement performance of the downlink carrier corresponding to the normal UL or a measurement performance of a second BWP of the downlink carrier corresponding to the normal UL.

It should be noted that, in the embodiments of the present disclosure, the ninth preset threshold, the tenth preset threshold, and the eleventh preset threshold are not specifically limited.

In this way, the UE may determine the target RACH resource from the RACH resources of the two or more UL; and then perform random access according to the target RACH resource to improve the flexibility of random access.

Figure 4:
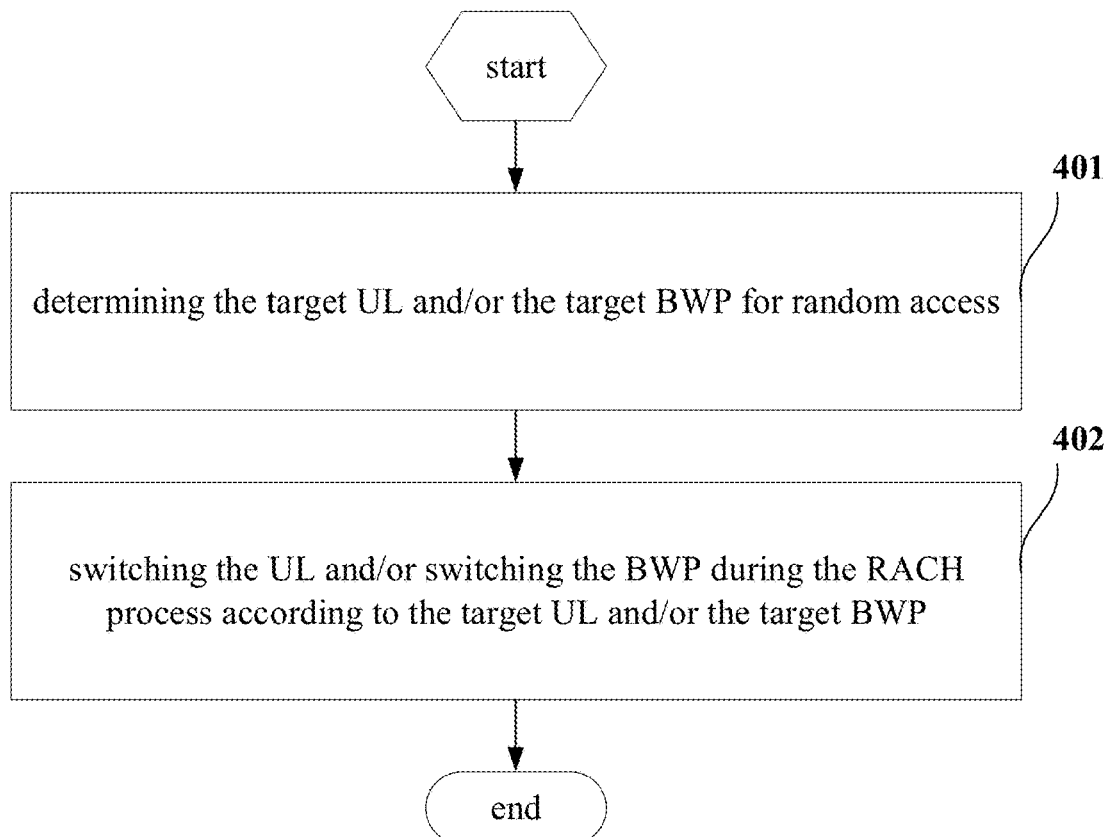
FIG. 4 is a third flowchart of the random access method according to an embodiment of the present disclosure.

Referring to FIG. 4, a flowchart of a random access method is shown. The method is executed by the UE, and specific steps are as follows.

Step 401: determining the target UL and/or the target BWP for random access.

Step 402: switching the UL and/or switching the BWP during the RACH process according to the target UL and/or the target BWP.

In scenario 1: during a same RACH attempt process, determining the target UL and/or the target BWP of the same RACH attempt process according to the one or the combination of at least two of the UL type, the UL frequency, the RACH resource type, and the measurement performance, wherein the measurement performance is the measurement performance of the UL or the BWP or the measurement performance of the downlink carrier corresponding to the normal UL; or determining the target UL and/or the target BWP of the same RACH attempt process according to a configuration of the network-side device.

Example 1: the currently used UL is transmitted by the UE through message 1 (msg1), and the target UL is determined by the UE according to the one or the combination of at least two of the UL type, the UL frequency, the RACH resource type, and the measurement performance, or according to a system broadcast message or a release message.

For example, when the UE enters an idle or non-activated state from a connection state, it informs the UE which UL to use for performing the RACH through the release message.

Example 2: the currently used UL is transmitted by the UE through message 3 (msg3). The UL may be same as a UL in message 1, or it is a target UL determined by the UE according to the one or the combination of at least two of the UL type, the UL frequency, the RACH resource type, and the measurement performance, or a target UL determined by the UE according to the system broadcast message, or a target UL determined by the UE through the release message, or a target UL determined according to message 2 (msg2) transmitted by the base station.

In the embodiments of the present disclosure, optionally, the message 2 can indicate the target UL explicitly or implicitly. For example, the message 2 contains an indication bit indicating the target UL, or a format, a time domain, a frequency domain or a beam position of the message 2 indicates the target UL implicitly.

In scenario 2: during an RACH preamble retransmission process in a same RACH process: a method 1 of selecting the UL and/or the BWP according to one or a combination of at least two of a UL type, a UL frequency, an RACH resource type, and a measurement performance; and determining a target UL and/or a target BWP of an RACH preamble retransmission process in the RACH process according to a currently used UL and/or a currently used BWP and a selected UL and/or a selected BWP; a method 2 of selecting the UL and/or the BWP according to the configuration of the network-side device; and determining the target UL and/or the target BWP of the RACH preamble retransmission process in the RACH process according to the currently used UL and/or the currently used BWP and the selected UL and/or the selected BWP.

Example 1: each time the RACH preamble is retransmitted, the currently used UL and the currently used BWP are used.

That is, when the RACH Preamble is retransmitted, the currently used UL is determined as the target UL, or the currently used UL and the currently used BWP are determined as the target UL and the target BWP.

Specifically, each time the RACH preamble is retransmitted, an output power ramping counter (POWER_RAMPING_COUNTER) and a preamble transmission counter (PREAMBLE_TRANSMISSION_COUNTER) are accumulated according to a known rule.

Example 2: when the RACH preamble is retransmitted, the currently used UL and the selected BWP are determined as the target UL and the target BWP.

Optionally, when the BWP is switched, the power ramping counter POWER_RAMPING_COUNTER and the preamble transmission counter PREAMBLE_TRANSMISSION_COUNTER of the RACH process are subjected to at least one of: a) accumulating the power ramping counter POWER_RAMPING_COUNTER and the preamble transmission counter PREAMBLE_TRANSMISSION_COUNTER respectively according to an existing rule (for example, it is increased by 1); b) accumulating the power ramping counter POWER_RAMPING_COUNTER and accumulating the preamble transmission counter PREAMBLE_TRANSMISSION_COUNTER; c) not accumulating the power ramping counter POWER_RAMPING_COUNTER and not accumulating the preamble transmission counter PREAMBLE_TRANSMISSION_COUNTER; d) when a retransmission is performed on the target BWP, accumulating the power ramping counter POWER_RAMPING_COUNTER corresponding to the target BWP and/or the preamble transmission counter PREAMBLE_TRANSMISSION_COUNTER corresponding to the target BWP (for example, it is increased by 1).

It should be noted that each BWP corresponds to a set of the power ramping counter POWER_RAMPING_COUNTER and the preamble transmission counter PREAMBLE_TRANSMISSION_COUNTER of the RACH process.

Optionally, when the BWP is switched, the RACH preamble retransmission is stopped directly, and the RACH preamble retransmission is restarted on the target BWP; or when the BWP is switched, the RACH preamble retransmission is suspended directly, and the RACH preamble retransmission is restarted on the target BWP; when the BWP is switched back to a previous BWP, a parameter of a previous one RACH preamble retransmission is used to continue the RACH preamble retransmission.

Example 3: each time the RACH preamble is retransmitted, reselected UL and BWP are used; that is, when the RACH preamble is retransmitted, the selected UL and the selected BWP are determined as the target UL and the target BWP.

Optionally, when the UL is switched, the power ramping counter POWER_RAMPING_COUNTER and the preamble transmission counter PREAMBLE_TRANSMISSION_COUNTER of the RACH process is subjected to at least one of: a) accumulating the power ramping counter POWER_RAMPING_COUNTER and the preamble transmission counter PREAMBLE_TRANSMISSION_COUNTER respectively according to an existing rule (for example, it is increased by 1); b) not accumulating the power ramping counter POWER_RAMPING_COUNTER, and accumulating the preamble transmission counter PREAMBLE_TRANSMISSION_COUNTER; c) not accumulating the power ramping counter POWER_RAMPING_COUNTER, and not accumulating the preamble transmission counter PREAMBLE_TRANSMISSION_COUNTER; d) when a retransmission is performed on the target UL, accumulating the power ramping counter POWER_RAMPING_COUNTER corresponding to the target UL and/or the preamble transmission counter PREAMBLE_TRANSMISSION_COUNTER corresponding to the target UL (for example, it is increased by 1).

It should be noted that each UL corresponds to the set of the power ramping counter POWER_RAMPING_COUNTER and the preamble transmission counter PREAMBLE_TRANSMISSION_COUNTER of the RACH process.

Optionally, when the UL is switched, the RACH preamble retransmission is stopped directly, and the RACH preamble retransmission is restarted on the target UL; or when the UL is switched, the RACH preamble retransmission is suspended directly, and the RACH preamble retransmission is restarted on the target UL; when the UL is switched back to a previous UL, the parameter of the previous one RACH preamble retransmission is used to continue the RACH preamble retransmission.

In this way, the target UL and/or the target BWP for random access is determined by the UE; and the UL and/or the BWP are switched during the RACH process according to the target UL and/or the target BWP, so as to improve the flexibility of random access.

A UE is further provided in the embodiments of the present disclosure. Since a principle of solving a problem by the UE is similar to the random access method in the embodiments of the present disclosure, an implementation of the UE may refer to an implementation of the method, and a description thereof will not be repeated herein.

Figure 5:
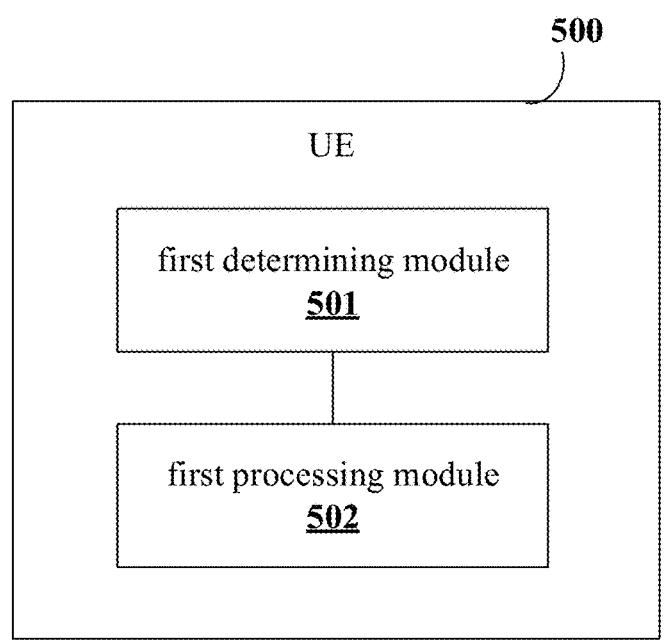
FIG. 5 is a first schematic structural diagram of a UE according to an embodiment of the present disclosure.

Referring to FIG. 5, a structure of a UE 500 is shown. The UE 500 includes: a first determining module 501, used to determine a target RACH resource from RACH resources of two or more ULs; and a first processing module 502, used to perform random access according to the target RACH resource.

In the embodiments of the present disclosure, optionally, the first determining module 501 is further used to: determine the target RACH resource from the RACH resources of the two or more ULs according to one or a combination of at least two of a UL type, a UL frequency, an RACH resource type, and a measurement performance, wherein the measurement performance is a measurement performance of the UL or a BWP or a measurement performance of a downlink carrier corresponding to the normal UL.

In the embodiments of the present disclosure, optionally, the first determining module 501 is further used to implement a following step.

In particular, the first determining module 501 is further used to, when a measurement of a first UL is higher than a measurement of a second UL or a measurement of a downlink carrier corresponding to the first UL is higher than a measurement of a downlink carrier corresponding to the second UL, determine an RACH resource of the first UL as the target RACH resource, wherein the measurement of the first UL is a measurement performance of the first UL or a measurement performance of a first BWP of the first UL, the measurement of the second UL is a measurement performance of the second UL or a measurement performance of a second BWP of the second UL, the RACH resource of the first UL corresponds to an RACH resource on the first UL or an RACH resource on the first BWP of the first UL.

Alternatively, the first determining module 501 is further used to, when the measurement of the first UL or the measurement of the downlink carrier corresponding to the first UL is lower than a first preset threshold, determine an RACH resource of another UL in two or more ULs as the target RACH resource, wherein the measurement of the first UL is the measurement performance of the first UL or the measurement performance of the first BWP of the first UL, and the measurement of the downlink carrier corresponding to the first UL is the measurement performance of the downlink carrier corresponding to the first UL or the measurement performance of the first BWP of the downlink carrier corresponding to the first UL; and the RACH resource of the other UL corresponds to the RACH resource on the other UL or an RACH resource on a second BWP of the other UL.

Alternatively, the first determining module 501 is further used to, when the measurement of the first UL or the measurement of the downlink carrier corresponding to the first UL is higher than a second preset threshold, determine the RACH resource of the first UL as the target RACH resource, wherein the measurement of the first UL is the measurement performance of the first UL or the measurement performance of the first BWP of the first UL, and the measurement of the downlink carrier corresponding to the first UL is the measurement performance of the downlink carrier corresponding to the first UL or the measurement performance of the first BWP of the downlink carrier corresponding to the first UL; and the RACH resource of the first UL corresponds to the RACH resource on the first UL or the RACH resource on the first BWP of the first UL.

Alternatively, the first determining module 501 is further used to, when the measurement of the first UL or the measurement of the downlink carrier corresponding to the first UL is lower than a third preset threshold, and the measurement of the second UL or the measurement of the downlink carrier corresponding to the second UL is higher than the third preset threshold, determine the RACH resource of the second UL as the target RACH resource, wherein the measurement of the first UL is the measurement performance of the first UL or the measurement performance of the first BWP of the first UL, and the measurement of the downlink carrier corresponding to the first UL is the measurement performance of the downlink carrier corresponding to the first UL or the measurement performance of the first BWP of the downlink carrier corresponding to the first UL, the measurement of the second UL is the measurement performance of the second UL or the measurement performance of the second BWP of the second UL, the measurement of the downlink carrier corresponding to the second UL is the measurement performance of the downlink carrier corresponding to the second UL or the measurement performance of the second BWP of the downlink carrier corresponding to the second UL, and the RACH resource of the second UL corresponds to an RACH resource on the second UL or an RACH resource on the second BWP of the second UL.

Alternatively, the first determining module 501 is further used to, when the measurement of the first UL is higher than the measurement of the second UL or the measurement of the downlink carrier corresponding to the first UL is higher than the measurement of the downlink carrier corresponding to the second UL, and the measurement of the first UL or the measurement of the downlink carrier corresponding to the first UL is higher than a fourth preset threshold, determine the RACH resource of the first UL as the target RACH resource, wherein the measurement of the first UL is the measurement performance of the first UL or the measurement performance of the first BWP of the first UL, the measurement of the downlink carrier corresponding to the first UL is the measurement performance of the downlink carrier corresponding to the first UL or the measurement performance of the first BWP of the downlink carrier corresponding to the first UL, the measurement of the second UL is the measurement performance of the second UL or the measurement performance of the second BWP of the second UL, the measurement of the downlink carrier corresponding to the second UL is the measurement performance of the downlink carrier corresponding to the second UL or the measurement performance of the second BWP of the downlink carrier corresponding to the second UL, and the RACH resource of the first UL corresponds to the RACH resource on the first UL or the RACH resource on the first BWP of the first UL.

In the embodiments of the present disclosure, optionally, the first determining module 501 is further used to: select a UL from two or more ULs according to the one or the combination of at least two of the UL type, the UL frequency, the RACH resource type, and the measurement performance; and determine the target RACH resource from the selected UL according to the RACH resource type and/or the measurement performance.

In the embodiments of the present disclosure, optionally, the first determining module 501 is further used to: select the normal UL from the two or more ULs; and determine a dedicated RACH resource on a first BWP of the normal UL as the target RACH resource; or the first determining module 501 is further used to: select the normal UL from the two or more ULs; when a measurement of the first BWP of the normal UL or a measurement of the downlink carrier corresponding to the normal UL or a measurement of a first BWP of the downlink carrier corresponding to the normal UL is higher than a fifth preset threshold, determine an RACH resource on the first BWP of the normal UL as the target RACH resource, wherein a measurement of the normal UL is a measurement performance of the normal UL or a measurement performance of the first BWP of the normal UL, and the measurement of the downlink carrier corresponding to the normal UL is the measurement performance of the downlink carrier corresponding to the normal UL or a measurement performance of the first BWP of the downlink carrier corresponding to the normal UL.

In the embodiments of the present disclosure, optionally, the first determining module 501 is further used to: select an RACH resource on a UL from the two or more ULs as the target RACH resource according to a combination of at least two of the UL type, the UL frequency, the RACH resource type, and the measurement performance of the UL or the BWP or the measurement performance of the downlink carrier corresponding to the normal UL; or select a UL from the two or more ULs and select an RACH resource of the UL as the target RACH resource according to a combination of at least two of the UL type, the UL frequency, the RACH resource type, and the measurement performance.

In the embodiments of the present disclosure, optionally, the first determining module 501 is further used to implement a following step.

In particular, the first determining module 501 is further used to, when a measurement of a first UL or a measurement of a downlink carrier corresponding to the first UL is higher than a sixth preset threshold, and/or a measurement of a second UL or a measurement of a downlink carrier corresponding to the second UL is low than the sixth preset threshold, determine an RACH resource of the first UL as the target RACH resource, wherein the measurement of the first UL is a measurement performance of the first UL or a measurement performance of a first BWP of the first UL, and the measurement of the downlink carrier corresponding to the first UL is a measurement performance of the downlink carrier corresponding to the first UL or a measurement performance of a first BWP of the downlink carrier corresponding to the first UL; the measurement of the second UL is a measurement performance of the second UL or a measurement performance of a second BWP of the second UL, and the measurement of the downlink carrier corresponding to the second UL is a measurement performance of the downlink carrier corresponding to the second UL or a measurement performance of a second BWP of the downlink carrier corresponding to the second UL; and the RACH resource of the first UL corresponds to an RACH resource on the first UL or an RACH resource on the first BWP of the first UL.

Alternatively, the first determining module 501 is further used to, when the first UL is configured with a dedicated RACH resource, determine the dedicated RACH resource of the first UL as the target RACH resource.

Alternatively, the first determining module 501 is further used to, when the measurement of the first UL or the measurement of the downlink carrier corresponding to the first UL is higher than a seventh preset threshold, and the first UL is configured with the dedicated RACH resource, determine the dedicated RACH resource of the first UL as the target RACH resource, wherein the measurement of the first UL is the measurement performance of the first UL or the measurement performance of the first BWP of the first UL, and the measurement of the downlink carrier corresponding to the first UL is the measurement performance of the downlink carrier corresponding to the first UL or the measurement performance of the first BWP of the downlink carrier corresponding to the first UL.

Alternatively, the first determining module 501 is further used to, when a measurement of the normal UL or a measurement of the downlink carrier corresponding to the normal UL is higher than an eighth preset threshold, and the normal UL is configured with the dedicated RACH resource, determine the dedicated RACH resource of the normal UL as the target RACH resource, wherein the measurement of the normal UL is a measurement performance of the normal UL or a measurement performance of a first BWP of the normal UL, and the measurement of the downlink carrier corresponding to the normal UL is the measurement performance of the downlink carrier corresponding to the normal UL or a measurement performance of a first BWP of the downlink carrier corresponding to the normal UL.

In the embodiments of the present disclosure, optionally, the first determining module 501 is further used to: determine the target RACH resource from the RACH resources of the two or more ULs according to an RACH purpose or an RACH reason.

In the embodiments of the present disclosure, optionally, the first determining module 501 is further used to: determine an RACH resource of a normal UL or an SUL among the RACH resources of the two or more ULs as the target RACH resource according to the RACH purpose or the RACH reason; or determine a dedicated RACH resource among the RACH resources of the two or more ULs as the target RACH resource according to the RACH purpose or the RACH reason.

In the embodiments of the present disclosure, optionally, the first determining module 501 is further used to: determine an RACH resource of a currently non-activated BWP of a current UL as the target RACH resource according to the RACH resource type and/or the measurement performance, wherein there is no RACH resource on an activated BWP of the current UL.

In the embodiments of the present disclosure, optionally, the first determining module 501 is further used to: select an SUL from the two or more ULs; and determine a dedicated RACH resource of a BWP of the SUL as the target RACH resource; or the first determining module 501 is further used to: select an SUL from the two or more ULs; when a measurement of the SUL or a measurement of the first BWP of the SUL is higher than a ninth preset threshold, determine the RACH resource of the SUL as the target RACH resource, wherein the measurement of the SUL is a measurement performance of the SUL or a measurement performance of the first BWP of the SUL, the measurement of the downlink carrier corresponding to the SUL is a measurement performance of the downlink carrier corresponding to the SUL or a measurement performance of a first BWP of the downlink carrier corresponding to the SUL, and the RACH resource of the SUL corresponds to an RACH resource on the SUL or an RACH resource on a second BWP of the SUL.

In the embodiments of the present disclosure, optionally, the first determining module 501 is further used to: when a measurement of the SUL or a measurement of a downlink carrier corresponding to the SUL is higher than a tenth preset threshold, and/or a measurement of the normal SUL or a measurement of the downlink carrier corresponding to the normal UL is lower than the tenth preset threshold, determine an RACH resource on the SUL as the target RACH resource; or when the SUL is configured with a dedicated RACH resource, determine the dedicated RACH resource of the SUL as the target RACH resource; or when the measurement of the UL is higher than an eleventh preset threshold and the UL is configured with the dedicated RACH resource, determining a dedicated RACH resource of the UL as the target RACH resource; or when the measurement of the SUL or the measurement of the downlink carrier corresponding to the SUL is higher than the eleventh preset threshold, and the SUL is configured with the dedicated RACH resource, determine the dedicated RACH resource of the SUL as the target RACH resource.

The UE provided by the embodiments of the present disclosure may execute the above method embodiments, and implementation principles and technical effects thereof are similar, a description thereof will not be repeated in this embodiment.

A UE is further provided in the embodiments of the present disclosure. Since a principle of solving a problem by the UE is similar to the random access method in the embodiments of the present disclosure, an implementation of the UE can refer to an implementation of the method, and a description thereof will not be repeated herein.

Figure 6:
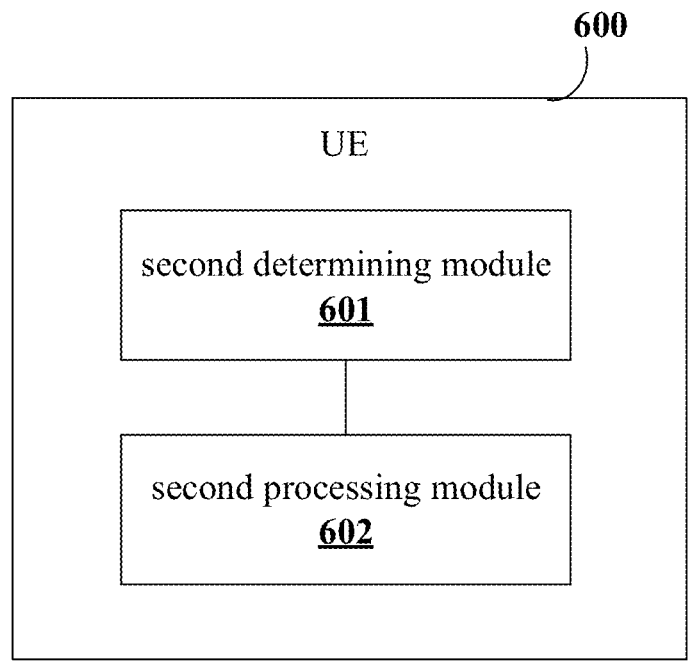
FIG. 6 is a second schematic structural diagram of the UE according to an embodiment of the present disclosure.

Referring to FIG. 6, a structure of a UE 600 is shown. The UE 600 includes: a second determining module 601, used to determine a target UL and/or a target BWP for random access; and a second processing module 602, used to switch a UL and/or switch a BWP during an RACH process according to the target UL and/or the target BWP.

In the embodiments of the present disclosure, optionally, the second determining module 601 is further used to: determine a target UL and/or a target BWP of a same RACH attempt process according to one or a combination of at least two of a UL type, a UL frequency, an RACH resource type, and a measurement performance; or determine the target UL and/or the target BWP of the RACH attempt process according to a configuration of a network-side device.

In the embodiments of the present disclosure, optionally, the second determining module 601 is further used to: select the UL and/or the BWP according to one or a combination of at least two of a UL type, a UL frequency, an RACH resource type, and a measurement performance; determine a target UL and/or a target BWP of an RACH preamble retransmission process in the RACH process according to a currently used UL and/or a currently used BWP and a selected UL and/or a selected BWP; or select the UL and/or the BWP according to a configuration of a network-side device; determine the target UL and/or the target BWP of the RACH preamble retransmission process in the RACH process according to the currently used UL and/or the currently used BWP and the selected UL and/or the selected BWP.

In the embodiments of the present disclosure, optionally, the second determining module 601 is further used to: when the RACH preamble is retransmitted, determine the currently used UL as the target UL, or determine the currently used UL and the currently used BWP as the target UL and the target BWP.

In the embodiments of the present disclosure, optionally, the second processing module 601 is further used to: accumulate an output power ramping counter POWER_RAMPING_COUNTER and a preamble transmission counter PREAMBLE_TRANSMISSION_COUNTER according to an existing rule.

In the embodiments of the present disclosure, optionally, the second determining module 601 is further used to: determine the currently used UL and the selected BWP as the target UL and the target BWP when the RACH preamble is retransmitted.

In the embodiments of the present disclosure, optionally, the second processing module 601 is further used to: when the BWP is switched, subject the power ramping counter POWER_RAMPING_COUNTER and the preamble transmission counter PREAMBLE_TRANSMISSION_COUNTER of the RACH process to at least one of: accumulating the power ramping counter POWER_RAMPING_COUNTER and the preamble transmission counter PREAMBLE_TRANSMISSION_COUNTER respectively according to an existing rule; or accumulating the power ramping counter POWER_RAMPING_COUNTER and accumulating the preamble transmission counter PREAMBLE_TRANSMISSION_COUNTER; or not accumulating the power ramping counter POWER_RAMPING_COUNTER and not accumulating the preamble transmission counter PREAMBLE_TRANSMISSION_COUNTER; when a retransmission is performed on the target BWP, accumulating the power ramping counter POWER_RAMPING_COUNTER corresponding to the target BWP and/or the preamble transmission counter PREAMBLE_TRANSMISSION_COUNTER corresponding to the target BWP.

In the embodiments of the present disclosure, optionally, the second processing module 602 is further used to: when the BWP is switched, stop the RACH preamble retransmission directly, and restart the RACH preamble retransmission on the target BWP; or when the BWP is switched, suspend the RACH preamble retransmission directly, and restart the RACH preamble retransmission on the target BWP; when being switched back to a previous BWP, use a parameter of a previous one RACH preamble retransmission to continue the RACH preamble retransmission.

In the embodiments of the present disclosure, optionally, the second determining module 601 is further used to: determine the selected UL and the selected BWP as the target UL and the target BWP when the RACH preamble is retransmitted.

In the embodiments of the present disclosure, optionally, the second processing module 602 is further used to: when the UL is switched, subject the power ramping counter POWER_RAMPING_COUNTER and the preamble transmission counter PREAMBLE_TRANSMISSION_COUNTER of the RACH process to at least one of: accumulating the power ramping counter POWER_RAMPING_COUNTER and the preamble transmission counter PREAMBLE_TRANSMISSION_COUNTER respectively according to an existing rule; not accumulating the power ramping counter POWER_RAMPING_COUNTER, and accumulating the preamble transmission counter PREAMBLE_TRANSMISSION_COUNTER; not accumulating the power ramping counter POWER_RAMPING_COUNTER, and not accumulating the preamble transmission counter PREAMBLE_TRANSMISSION_COUNTER; when a retransmission is performed on the target UL, accumulating the power ramping counter POWER_RAMPING_COUNTER corresponding to the target UL and/or the preamble transmission counter PREAMBLE_TRANSMISSION_COUNTER corresponding to the target UL.

In the embodiments of the present disclosure, optionally, the second processing module 602 is further used to: when the UL is switched, stop the RACH preamble retransmission directly and restart the RACH preamble retransmission on the target UL; or when the UL is switched, suspend the RACH preamble retransmission directly, and restart the RACH preamble retransmission on the target UL; when being switched back to a previous UL, use a parameter of a previous one RACH preamble retransmission to continue the RACH preamble retransmission.

The UE provided by the embodiments of the present disclosure may implement the above method embodiments, and implementation principles and technical effects thereof are similar, a description thereof will not be repeated in this embodiment.

Figure 7:
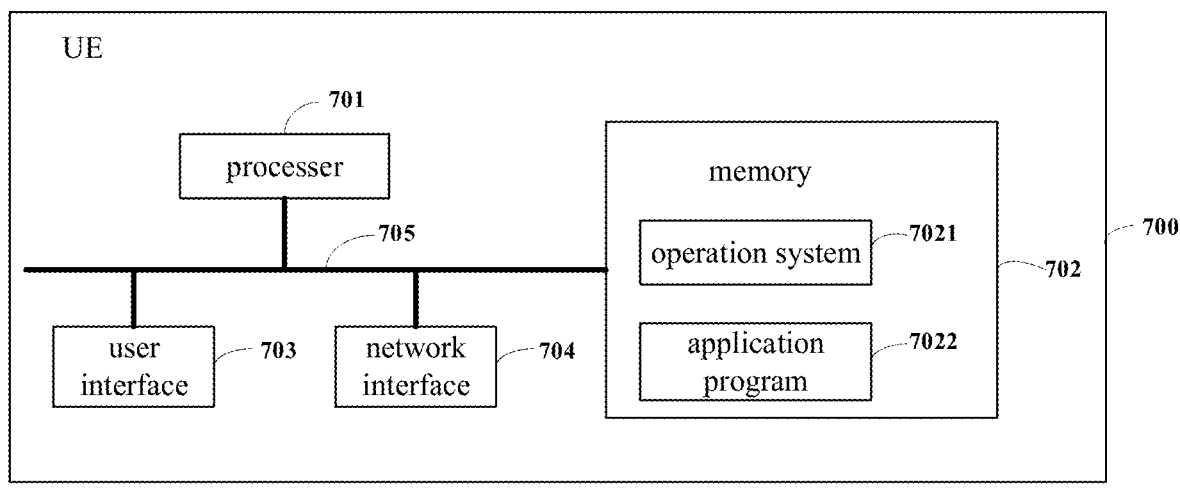
FIG. 7 is a third schematic structural diagram of the UE according to an embodiment of the present disclosure.

As shown in FIG. 7, the UE 700 includes: at least one processor 701, a memory 702, at least one network interface 704, a user interface 703. Various components in the UE 700 are coupled together by a bus system 705. It should be appreciated that the bus system 705 is used to implement connection communication between these components. In addition to a data bus, the bus system 705 further includes a power bus, a control bus, and a status signal bus. However, for clarity of description, various buses are all labeled as the bus system 705 in FIG. 7.

The user interface 703 may include a display, a keyboard, or a pointing device (for example, a mouse, a trackball, a touch pad, or a touch screen, etc.).

It should be appreciated that the memory 702 in this embodiment of the present disclosure may be a volatile memory or a non-volatile memory, or may include both the volatile memory and the non-volatile memory. The non-volatile memory may be a Read Only Memory (ROM), a Programmable Read Only Memory (PROM), an Erasable Programmable Read Only Memory (EPROM), an Electrically Erasable Programmable Read Only Memory (EEPROM) or flash memory. The volatile memory may be a Random Access Memory (RAM) that acts as an external cache. By way of example and not limitation, many forms of RAMs may be used, such as a Static Random Access Memory (SRAM), a Dynamic Random Access Memory (DRAM), a Synchronous Dynamic Random Access Memory (SDRAM), a Double Data Rate Synchronous Dynamic Random Access Memory (DDRSDRAM), an Enhanced Synchronous Dynamic Random Access Memory (ESDRAM), a Synchlink Dynamic Random Access Memory (SLDRAM) and a Direct Rambus Random Access Memory (DRRAM). The memory 702 of the systems and methods described in the embodiments of the present disclosure is intended to include, without being limited to, these and any other suitable types of memories.

In some embodiments, the memory 702 stores the following elements, executable modules or data structures, or a subset thereof, or an extended set thereof: an operating system 7021 and an application program 7022.

The operating system 7021 includes various system programs, such as a framework layer, a core library layer and a driver layer, for implementing various basic services and processing hardware-based tasks. The application program 7022 includes various applications, such as a Media Player and a Browser, for implementing various application services. A program implementing the method of the embodiments of the present disclosure may be included in the application program 7022.

In the embodiments of the present disclosure, the following steps may be implemented when a program or an instruction stored in the memory 702, specifically, a program or an instruction stored in the application program 7022, is executed: determining the target RACH resource from the RACH resources of the two or more ULs; and performing random access according to the target RACH resource. Alternatively, in the embodiments of the present disclosure, the following steps may be implemented when the program or the instruction stored in the memory 702, specifically, the program or the instruction stored in the application program 7022, is executed: determining the target UL and/or the target BWP for random access; and switching the UL and/or switching the BWP during the RACH process according to the target UL and/or the target BWP.

The UE provided by the embodiments of the present disclosure may execute the above method embodiments, and implementation principles and technical effects thereof are similar, a description thereof will not be repeated in this embodiment.

Steps of a method or an algorithm described in combination with the present disclosure may be implemented in hardware, or may be implemented in a software instruction executed by a processor. The software instruction may be composed of a corresponding software module, and the software module may be stored in a RAM, flash memory, ROM, EPROM, EEPROM, register, hard disk, mobile hard disk, read-only optical disk, or any other form of storage medium known in the art. An exemplary storage medium is coupled to the processor, so that the processor can read information from, and write information to, the storage medium. Naturally, the storage medium may also be a part of the processor. The processor and the storage medium may be arranged in an Application Specific Integrated Circuit (ASIC). In addition, the ASIC may be arranged in a core network interface device. Naturally, the processor and the storage medium may also exist in the core network interface device as discrete components.

A person skilled in the art should appreciate that, in one or more of the above examples, the functions described in the present disclosure may be implemented in hardware, software, firmware, or any combination thereof. When being implemented in software, the functions may be stored on a computer-readable medium or transmitted as one or more instructions or codes on the computer-readable medium. The computer-readable medium includes a computer storage medium and a communication medium, wherein the communication medium includes any medium that facilitates transfer of a program from one place to another. The storage medium may be any available medium that may be accessed by a general purpose or special purpose computer.

Specific implementations described above further describe objectives, technical solutions, and beneficial effects of the present disclosure in detail. It should be understood that the above descriptions are merely specific implementations of the present disclosure, and are not intended to limit the protection scope of the present disclosure. Any modification, equivalent replacement, or improvement, and the like made based on the technical solutions of the present disclosure shall be included in the protection scope of the present disclosure.

A person skilled in the art should understand that the embodiments of the present disclosure may be provided as a method, a system, or a computer program product. Therefore, the embodiments of the present disclosure may take a form of entirely hardware embodiments, entirely software embodiments, or embodiments combining software and hardware. Moreover, the embodiments of the present disclosure may take a form of a computer program product implemented on one or more computer-usable storage medium (including but not limited to disk storage, Compact Disc (CD)-ROM, optical storage, etc.) containing computer-usable program code.

The embodiments of the present disclosure are described with reference to flowcharts and/or block diagrams of methods, devices (systems), and computer program products according to the embodiments of the present disclosure. It should be appreciated that each flow and/or block in the flowcharts and/or block diagrams, and combinations of flows and/or blocks in the flowcharts and/or block diagrams can be implemented by computer program instructions. These computer program instructions may be provided to a processor of a general-purpose computer, a special-purpose computer, an embedded processor, or other programmable data processing device to produce a machine, so that instructions executed by the processor of the computer or the other programmable data processing device are used to generate a device for implementing functions specified in one or more flows of the flowchart and/or one or more blocks of the block diagram.

These computer program instructions may also be stored in a computer-readable storage capable of directing a computer or other programmable data processing device to operate in a specific manner, so that the instructions stored in the computer-readable storage produce a product including an instruction device. The instruction device implements functions specified in one or more flows of the flowchart and/or one or more blocks of the block diagram.

These computer program instructions may also be loaded onto the computer or the other programmable data processing device, so that a series of operational steps may be performed on the computer or the other programmable device to generate a computer-implemented process, and the computer or the other programmable device executes the instructions to provide steps for implementing functions specified in one or more flows of the flowchart and/or one or more blocks of the block diagram.

Obviously, a person skilled in the art can make various modifications and variations to the embodiments of the present disclosure without departing from the scope of the present disclosure. Thus, when these modifications and variations of the embodiments of the present disclosure fall within the scope of the claims and their equivalent of the present disclosure, the present disclosure also intends to include these modifications and variations.

What is claimed is:

1. A random access method, comprising:
   determining a target Random Access Channel (RACH) resource from RACH resources of two or more Uplinks (ULs); and
   performing random access according to the target RACH resource,
   wherein determining the target RACH resource from the RACH resources of the two or more ULs comprises:
   determining the target RACH resource from the RACH resources of the two or more ULs according to a measurement performance, and one or a combination of at least two of a UL type, a UL frequency, an RACH resource type,
   wherein the UL type comprises, a Supplementary UL (SUL) and a normal UL, and the measurement performance is a measurement performance of the UL or a Bandwidth Part (BWP), or a measurement performance of a downlink carrier corresponding to the normal UL.

2. The method according to claim 1, wherein determining the target RACH resource from the RACH resources of the two or more ULs according to the measurement performance, and the one or the combination of at least two of the UL type, the UL frequency, and the RACH resource type comprises:
   when a measurement of a first UL is higher than a measurement of a second UL or a measurement of a downlink carrier corresponding to the first UL is higher than a measurement of a downlink carrier corresponding to the second UL, determining an RACH resource of the first UL as the target RACH resource, wherein the measurement of the first UL is a measurement performance of the first UL or a measurement performance of a first BWP of the first UL, the measurement of the second UL is a measurement performance of the second UL or a measurement performance of a second BWP of the second UL, the RACH resource of the first UL corresponds to an RACH resource on the first UL or an RACH resource on the first BWP of the first UL, the measurement of the downlink carrier corresponding to the first UL is a measurement performance of the downlink carrier corresponding to the first UL or a measurement performance of a first BWP of the downlink carrier corresponding to the first UL, and the measurement of the downlink carrier corresponding to the second UL is a measurement performance of the downlink carrier corresponding to the second UL or a measurement performance of a second BWP of the downlink carrier corresponding to the second UL; or
   when the measurement of the first UL or the measurement of the downlink carrier corresponding to the first UL is lower than a first preset threshold, determining an RACH resource of another UL in two or more ULs as the target RACH resource, wherein the measurement of the first UL is the measurement performance of the first BWP of the first UL, and the measurement of the downlink carrier corresponding to the first UL is the measurement performance of the downlink carrier corresponding to the first UL or the measurement performance of the first BWP of the downlink carrier corresponding to the first UL; and the RACH resource of the other UL corresponds to the RACH resource on the other UL or an RACH resource on a second BWP of the other UL; or
   when the measurement of the first UL or the measurement of the downlink carrier corresponding to the first UL is higher than a second preset threshold, determining the RACH resource of the first UL as the target RACH resource, wherein the measurement of the first UL is the measurement performance of the first UL or the measurement performance of the first BWP of the first UL, and the measurement of the downlink carrier corresponding to the first UL is the measurement performance of the downlink carrier corresponding to the first UL or the measurement performance of the first BWP of the downlink carrier corresponding to the first UL; and the RACH resource of the first UL corresponds to the RACH resource on the first UL or the RACH resource on the first BWP of the first UL; or
   when the measurement of the first UL or the measurement of the downlink carrier corresponding to the first UL is lower than a third preset threshold, and the measurement of the second UL or the measurement of the downlink carrier corresponding to the second UL is higher than the third preset threshold, determining the RACH resource of the second UL as the target RACH resource, wherein the measurement of the first UL is the measurement performance of the first UL or the measurement performance of the first BWP of the first UL, and the measurement of the downlink carrier corresponding to the first UL is the measurement performance of the downlink carrier corresponding to the first UL or the measurement performance of the first BWP of the downlink carrier corresponding to the first UL, the measurement of the second UL is the measurement performance of the second UL or the measurement performance of the second BWP of the second UL, the measurement of the downlink carrier corresponding to the second UL is the measurement performance of the downlink carrier corresponding to the second UL or the measurement performance of the second BWP of the downlink carrier corresponding to the second UL, and the RACH resource of the second UL corresponds to an RACH resource on the second UL or an RACH resource on the second BWP of the second UL; or
   when the measurement of the first UL is higher than the measurement of the second UL or the measurement of the downlink carrier corresponding to the first UL is higher than the measurement of the downlink carrier corresponding to the second UL, and the measurement of the first UL or the measurement of the downlink carrier corresponding to the first UL is higher than a fourth preset threshold, determining the RACH resource of the first UL as the target RACH resource, wherein the measurement of the first UL is the measurement performance of the first UL or the measurement performance of the first BWP of the first UL, the measurement of the downlink carrier corresponding to the first UL is the measurement performance of the downlink carrier corresponding to the first UL or the measurement performance of the first BWP of the downlink carrier corresponding to the first UL, the measurement of the second UL is the measurement performance of the second UL or the measurement performance of the second BWP of the second UL, the measurement of the downlink carrier corresponding to the second UL is the measurement performance of the downlink carrier corresponding to the second UL or the measurement performance of the second BWP of the downlink carrier corresponding to the second UL, and the RACH resource of the first UL corresponds to the RACH resource on the first UL or the RACH resource on the first BWP of the first UL.

3. The method according to claim 1, wherein determining the target RACH resource from the RACH resources of the two or more ULs according to the measurement performance, and the one or the combination of at least two of the UL type, the UL frequency, and the RACH resource type comprises:
selecting a UL from two or more ULs according to the one or the combination of at least two of the UL type, the UL frequency, and the RACH resource type; and
determining the target RACH resource from the selected UL according to the measurement performance.

4. The method according to claim 3, wherein
selecting a UL from the two or more ULs according to the one or the combination of at least two of the UL type, the UL frequency, and the RACH resource type comprises:
selecting the normal UL from the two or more ULs;
determining the target RACH resource from the selected UL according to the measurement performance comprises:
when a measurement of the first BWP of the normal UL or a measurement of the downlink carrier corresponding to the normal UL or a measurement of a first BWP of the downlink carrier corresponding to the normal UL is higher than a fifth preset threshold, determining an RACH resource on the first BWP of the normal UL as the target RACH resource, wherein the first BWP measurement of the normal UL is a measurement performance of the first BWP of the normal UL, and the measurement of the downlink carrier corresponding to the normal UL is the measurement performance of the downlink carrier corresponding to the normal UL, and the measurement of the first BWP of the downlink carrier corresponding to the normal UL is a measurement performance of the first BWP of the downlink carrier corresponding to the normal UL.

5. The method according to claim 1, wherein determining the target RACH resource from the RACH resources of the two or more ULs according to the measurement performance, and the one or the combination of at least two of the UL type, the UL frequency, and the RACH resource type comprises:
selecting an RACH resource on a UL from the two or more ULs as the target RACH resource according to the measurement performance, and the combination of at least two of the UL type, the UL frequency, and the RACH resource type; or
selecting a UL from the two or more ULs and selecting an RACH resource of the UL as the target RACH resource according to the measurement performance, and the combination of at least two of the UL type, the UL frequency, and the RACH resource type.

6. The method according to claim 5, wherein selecting the RACH resource on the UL from the two or more ULs as the target RACH resource according to the measurement performance, and the combination of at least two of the UL type, the UL frequency, and the RACH resource type, selecting the UL from the two or more ULs and selecting the RACH resource of the UL as the target RACH resource according to the measurement performance, and the combination of at least two of the UL type, the UL frequency, and the RACH resource type comprises:
when a measurement of a first UL or a measurement of a downlink carrier corresponding to the first UL is higher than a sixth preset threshold, and/or a measurement of a second UL or a measurement of a downlink carrier corresponding to the second UL is low than the sixth preset threshold, determining an RACH resource of the first UL as the target RACH resource, wherein the measurement of the first UL is a measurement performance of the first UL or a measurement performance of a first BWP of the first UL, and the measurement of the downlink carrier corresponding to the first UL is a measurement performance of the downlink carrier corresponding to the first UL or a measurement performance of a first BWP of the downlink carrier corresponding to the first UL; the measurement of the second UL is a measurement performance of the second UL or a measurement performance of a second BWP of the second UL, and the measurement of the downlink carrier corresponding to the second UL is a measurement performance of the downlink carrier corresponding to the second UL or a measurement performance of a second BWP of the downlink carrier corresponding to the second UL; and the RACH resource of the first UL corresponds to an RACH resource on the first UL or an RACH resource on the first BWP of the first UL; or
when the measurement of the first UL or the measurement of the downlink carrier corresponding to the first UL is higher than a seventh preset threshold, and the first UL is configured with the dedicated RACH resource, determining the dedicated RACH resource of the first UL as the target RACH resource, wherein the measurement of the first UL is the measurement performance of the first UL or the measurement performance of the first BWP of the first UL, and the measurement of the downlink carrier corresponding to the first UL is the measurement performance of the downlink carrier corresponding to the first UL or the measurement performance of the first BWP of the downlink carrier corresponding to the first UL; or
when a measurement of the normal UL or a measurement of the downlink carrier corresponding to the normal UL is higher than an eighth preset threshold, and the normal UL is configured with the dedicated RACH resource, determining the dedicated RACH resource of the normal UL as the target RACH resource, wherein the measurement of the normal UL is a measurement performance of the normal UL or a measurement performance of a first BWP of the normal UL, and the measurement of the downlink carrier corresponding to the normal UL is the measurement performance of the downlink carrier corresponding to the normal UL or a measurement performance of a first BWP of the downlink carrier corresponding to the normal UL.

7. The method according to claim 1, wherein determining the target RACH resource from the RACH resources of the two or more ULs comprises:
determining the target RACH resource from the RACH resources of the two or more ULs according to an RACH purpose or an RACH reason.

8. The method according to claim 7, wherein determining the target RACH resource from the RACH resources of the two or more ULs according to the RACH purpose or the RACH reason comprises:
determining an RACH resource of a normal UL or an SUL among the RACH resources of the two or more ULs as the target RACH resource according to the RACH purpose or the RACH reason; or determining a dedicated RACH resource among the RACH resources of the two or more ULs as the target RACH resource according to the RACH purpose or the RACH reason.

9. The method according to claim 1, wherein determining the target RACH resource from the RACH resources of the two or more ULs according to the measurement performance, and the one or the combination of at least two of the UL type, the UL frequency, the RACH resource type comprises:

determining an RACH resource of a currently non-activated BWP of a current UL as the target RACH resource according to the RACH resource type and the measurement performance, wherein there is no RACH resource on an activated BWP of the current UL.

10. The method according to claim 1, wherein determining the target RACH resource from the RACH resources of the two or more ULs according to the measurement performance, and the one or the combination of at least two of the UL type, the UL frequency, and the RACH resource type comprises:

selecting an SUL from the two or more ULs;

when a measurement of the SUL or a measurement of a downlink carrier corresponding to the SUL is higher than a ninth preset threshold, determining the RACH resource of the SUL as the target RACH resource, wherein the measurement of the SUL is a measurement performance of the SUL or a measurement performance of the first BWP of the SUL, and the measurement of the downlink carrier corresponding to the SUL is a measurement performance of the downlink carrier corresponding to the SUL or a measurement performance of a first BWP of the downlink carrier corresponding to the SUL.

11. The method according to claim 1, wherein determining the target RACH resource from the RACH resources of the two or more ULs according to the measurement performance, and the one or the combination of at least two of the UL type, the UL frequency, and the RACH resource type comprises:

when a measurement of the SUL or a measurement of a downlink carrier corresponding to the SUL is higher than a tenth preset threshold, and/or a measurement of the normal UL or a measurement of the downlink carrier corresponding to the normal UL is lower than the tenth preset threshold, determining an RACH resource on the SUL as the target RACH resource; or when the measurement of the SUL or the measurement of the downlink carrier corresponding to the SUL is higher than an eleventh preset threshold, and the SUL is configured with the dedicated RACH resource, determining the dedicated RACH resource of the SUL as the target RACH resource, wherein the measurement of the SUL is a measurement performance of the SUL or a measurement performance of the first BWP of the SUL, and the measurement of the downlink carrier corresponding to the SUL is a measurement performance of the downlink carrier corresponding to the SUL or a measurement performance of a first BWP of the downlink carrier corresponding to the SUL; and the measurement of the normal UL is a measurement performance of the normal UL or a measurement performance of a first BWP of the normal UL, and the measurement of the downlink carrier corresponding to the normal UL is the measurement performance of the downlink carrier corresponding to the normal UL or a measurement performance of a second BWP of the downlink carrier corresponding to the normal UL.

12. A random access method, comprising:

determining a target UL and/or a target BWP for random access; and switching a UL and/or switching a BWP during an RACH process according to the target UL and/or the target BWP, wherein determining the target UL and/or the target BWP for random access comprises:

determining a target UL and/or a target BWP of a same RACH attempt process according to a measurement performance, and one or a combination of at least two of a UL type, a UL frequency, and an RACH resource type, wherein the measurement performance is a measurement performance of the UL or the BWP, or is a measurement performance of a downlink carrier corresponding to a normal UL; or determining target UL and/or the target BWP of the same RACH attempt process according to a configuration of a network-side device.

13. The method according to claim 12, wherein determining the target UL and/or the target BWP comprises:

selecting the UL and/or the BWP according to a measurement performance, and the one or the combination of at least two of the UL type, the UL frequency, the RACH resource type;

determining a target UL and/or a target BWP of an RACH preamble retransmission process in the RACH process according to a currently used UL and/or a currently used BWP and a selected UL and/or a selected BWP.

14. A UE, comprising: a processor, a memory, and a program stored on the memory and executable on the processor, wherein the program is used to be executed by the processor to:

determine a target RACH resource from RACH resources of two or more ULs; and perform random access according to the target RACH resource, wherein the program is further used to be executed by the processor to:

determine the target RACH resource from the RACH resources of the two or more ULs according to a measurement performance, and one or a combination of at least two of a UL type, a UL frequency, an RACH resource type, wherein the UL type comprises: an SUL and a normal UL, and the measurement performance is a measurement performance of the UL or a BWP or a measurement performance of a downlink carrier corresponding to the normal UL.

15. A UE, comprising: a processor, a memory, and a program stored on the memory and executable on the processor, wherein the program is used to be executed by the processor to implement steps of the random access method according to claim 12.

* * * * *